(12) United States Patent
Chen et al.

(10) Patent No.: US 11,509,425 B2
(45) Date of Patent: Nov. 22, 2022

(54) METHOD FOR DETERMINING HARQ-ACK FEEDBACK TIME, METHOD FOR INDICATING HARQ-ACK FEEDBACK TIME, TERMINAL DEVICE AND NETWORK DEVICE

(71) Applicant: VIVO MOBILE COMMUNICATION CO., LTD., Chang'an Dongguan (CN)

(72) Inventors: Xiaohang Chen, Chang'an Dongguan (CN); Zichao Ji, Chang'an Dongguan (CN); Zhi Lu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 189 days.

(21) Appl. No.: 16/961,543

(22) PCT Filed: Jan. 11, 2019

(86) PCT No.: PCT/CN2019/071375
§ 371 (c)(1),
(2) Date: Jul. 10, 2020

(87) PCT Pub. No.: WO2019/137481
PCT Pub. Date: Jul. 18, 2019

(65) Prior Publication Data
US 2021/0058196 A1   Feb. 25, 2021

(30) Foreign Application Priority Data
Jan. 12, 2018 (CN) .......................... 201810032500.1

(51) Int. Cl.
*H04L 1/18* (2006.01)
*H04W 72/04* (2009.01)

(52) U.S. Cl.
CPC ......... *H04L 1/1812* (2013.01); *H04W 72/042* (2013.01)

(58) Field of Classification Search
CPC ........................... H04L 1/1812; H04W 72/042
See application file for complete search history.

(56) References Cited

U.S. PATENT DOCUMENTS

| 2011/0128896 | A1 | 6/2011 | Huang et al. |
| 2013/0242923 | A1* | 9/2013 | Yang ..................... H04L 5/0048 370/329 |

(Continued)

FOREIGN PATENT DOCUMENTS

| CN | 106465391 A | 2/2017 |
| CN | 107347002 A | 11/2017 |

(Continued)

OTHER PUBLICATIONS

Japanese Office Action for related Application No. 2020-538673; dated Sep. 17, 2021.

(Continued)

*Primary Examiner* — Brenda H Pham
(74) *Attorney, Agent, or Firm* — von Briesen & Roper, s.c.

(57) ABSTRACT

A method for determining a HARQ-ACK feedback time, a method for indicating a HARQ-ACK feedback time, a terminal device, and a network device are provided. The method includes: receiving a downlink control signaling, wherein the downlink control signaling carries a HARQ-ACK feedback time parameter, and the downlink control signaling is used to activate a downlink semi-persistent scheduling configuration; receiving semi-persistent scheduling data for downlink transmission on a first time-domain resource; and determining the HARQ-ACK feedback time of the semi-persistent scheduling data for the downlink (Continued)

transmission, based on the HARQ-ACK feedback time parameter and the first time-domain resource.

20 Claims, 2 Drawing Sheets

(56) References Cited

U.S. PATENT DOCUMENTS

| | | | |
|---|---|---|---|
| 2019/0166616 A1 | 5/2019 | Liu et al. | |
| 2019/0238275 A1 | 8/2019 | Sun et al. | |
| 2019/0349145 A1 | 11/2019 | You | |
| 2020/0374048 A1* | 11/2020 | Lei | H04L 1/1896 |

FOREIGN PATENT DOCUMENTS

| | | |
|---|---|---|
| CN | 107733558 A | 2/2018 |
| CN | 108347307 A | 7/2018 |
| WO | 2016000209 A1 | 1/2016 |
| WO | 2017171299 A1 | 10/2017 |

OTHER PUBLICATIONS

Vivo, "Remaining issues on HARQ management", Jan. 22-26, 2018, 3GPP RAN WG1 Meeting AH 180, Vancouver, Canada.
International Search Report & Written Opinion related to Application No. PCT/CN2019/071375: dated Jul. 23, 2020.
Extended European Search Report related to Application No. 19738949.7; dated Dec. 20, 2018.
Samsung, "HARQ Management and Feedback", Oct. 13, 2017, 3GPP TSG RAN WG1 Meeting 90bis, Prague, CZ.
Samsung, "DL SPS operation for NR", Nov. 27-Dec. 1, 2017, 3GPP TSG RAN WG1 Meeting 91, Reno, US.

* cited by examiner

METHOD FOR DETERMINING HARQ-ACK FEEDBACK TIME, METHOD FOR INDICATING HARQ-ACK FEEDBACK TIME, TERMINAL DEVICE AND NETWORK DEVICE

CROSS-REFERENCE TO RELATED APPLICATION

This patent application is a 35 USC § 371 U.S. national stage of International Application No. PCT/CN2019/071375 filed on Jan. 11, 2019, which claims a priority to Chinese Patent Application No. 201810032500.1 filed on Jan. 12, 2018, the both disclosures of which are incorporated in their entireties by reference herein.

TECHNICAL FIELD

The present disclosure relates to the field of communications or terminals, in particular to a method for determining a HARQ-ACK feedback time, a method for indicating a HARQ-ACK feedback time, a terminal device and a network device.

BACKGROUND

In new radio (NR) systems, a base station can adopt a dynamic scheduling manner or a semi-persistent scheduling manner when scheduling downlink transmissions. When the dynamic scheduling manner is adopted, interaction of scheduling signaling is needed in each scheduling, which may cause a great overhead in the scheduling signaling; while the semi-persistent scheduling is adopted, interaction of scheduling signaling may be performed only at an initial scheduling, and subsequently, periodic scheduling may be performed based on the scheduling signaling interacted at the initial scheduling. Since there is no need to perform scheduling signaling interaction in each scheduling, the overhead of scheduling signaling can be reduced in the semi-persistent scheduling manner. Therefore, in the related technology, when scheduling data that is periodically transmitted in a fixed format, a base station usually adopts the semi-persistent scheduling manner for scheduling.

However, when the base station uses the dynamic scheduling manner to schedule downlink transmission, a downlink control information (DCI) signaling may be interacted in each scheduling, and the DCI signaling can be used to indicate a hybrid automatic repeat request acknowledgement (HARQ-ACK) feedback time after a user equipment (UE) receives data. The HARQ-ACK feedback time after the UE receives data may be configured in each downlink scheduling. However, when a base station adopts semi-persistent scheduling for downlink scheduling, since the interaction of DCI signaling is generally not performed in the case of non-initial scheduling, in each non-initial scheduling, the HARQ-ACK feedback time after a UE receives data cannot be configured in the related technology.

SUMMARY

In a first aspect, embodiments of the present disclosure provide a method for determining a HARQ-ACK feedback time, which is applied to a terminal device and includes:

receiving a downlink control signaling, where the downlink control signaling carries a HARQ-ACK feedback time parameter, and the downlink control signaling is used to activate a downlink semi-persistent scheduling configuration;

receiving semi-persistent scheduling data in downlink transmission on a first time-domain resource; and determining the HARQ-ACK feedback time of the semi-persistent scheduling data in the downlink transmission, based on the HARQ-ACK feedback time parameter and the first time-domain resource.

In a second aspect, embodiments of the present disclosure provide a method for indicating a HARQ-ACK feedback time, which is applied to a terminal network device and includes:

transmitting a downlink control signaling to a terminal device, where the downlink control signaling carries a HARQ-ACK feedback time parameter, and the downlink control signaling is used to activate a downlink semi-persistent scheduling configuration; and transmitting, to the terminal device, semi-persistent scheduling data in downlink transmission on a first time-domain resource, where the HARQ-ACK feedback time parameter is used to indicate the terminal device to determine the HARQ-ACK feedback time of the semi-persistent scheduling data in the downlink transmission based on the HARQ-ACK feedback time parameter and the first time-domain resource.

In a third aspect, embodiments of the present disclosure provide a terminal device configured with downlink semi-persistent scheduling. The terminal device includes:

a first reception module, configured to receive a downlink control signaling, where the downlink control signaling carries a HARQ-ACK feedback time parameter, and the downlink control signaling is used to activate a downlink semi-persistent scheduling configuration;

a second reception module, configured to receive semi-persistent scheduling data in downlink transmission on a first time-domain resource; and a determination module, configured to determine the HARQ-ACK feedback time of the semi-persistent scheduling data in the downlink transmission, based on the HARQ-ACK feedback time parameter and the first time-domain resource.

In a fourth aspect, embodiments of the present disclosure provide a network device, including:

a first transmission module, configured to transmit a downlink control signaling to a terminal device, where the downlink control signaling carries a HARQ-ACK feedback time parameter, and the downlink control signaling is used to activate a downlink semi-persistent scheduling configuration; and a second transmission module, configured to transmit, to the terminal device, semi-persistent scheduling data in downlink transmission on a first time-domain resource, where the HARQ-ACK feedback time parameter is used to indicate the terminal device to determine the HARQ-ACK feedback time of the semi-persistent scheduling data in the downlink transmission based on the HARQ-ACK feedback time parameter and the first time-domain resource.

In a fifth aspect, embodiments of the present disclosure provide a terminal device, which includes: a memory, a processor, and a program stored on the memory and executable on the processor. When executing the program, the processor is configured to implement steps of the method as described in the first aspect.

In a sixth aspect, embodiments of the present disclosure provide a terminal device, which includes: a memory, a processor, and a program stored on the memory and executable on the processor. When executing the program, the processor is configured to implement steps of the method as described in the second aspect.

In a seventh aspect, embodiment of the present disclosure provide a computer-readable storage medium. A program is stored on the computer-readable storage medium, and the program is executed by a processor to implement steps of the method as described in the first or second aspect.

BRIEF DESCRIPTION OF THE DRAWINGS

Drawings described herein are used to provide a further understanding of the present disclosure and form a part of the present disclosure. Exemplary embodiments of the present disclosure and descriptions thereof are used to explain the present disclosure and do not constitute an undue limitation onto the present disclosure. In the drawings.

DETAILED DESCRIPTION

Technical solutions in embodiments of the present disclosure will be clearly and completely described below in conjunction with the drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

The technical solutions of the present disclosure can be applied to various communication systems, such as: global system of mobile communication (GSM), code division multiple access (CDMA) systems, wideband code division multiple access (WCDMA) systems, general packet radio service (GPRS) systems, long term evolution (LTE) systems, LTE advanced (LTE-A) systems, or new radio (NR) systems.

User equipment (UE), which is also known as mobile terminal, mobile user equipment, etc., can communicate with one or more core networks via a radio access network (RAN). The UE may be a mobile terminal, such as a mobile phone (or referred to as "cellular" phone) and a computer with a mobile terminal. For example, the UE may be a portable mobile device, a pocket-sized mobile device, a handheld mobile device, a mobile device with a built-in computer, or a vehicle-mounted mobile device, which exchanges language and/or data with the RAN.

The base station may be a base transceiver station (BTS) in GSM or CDMA, or a base station (NodeB) in WCDMA, or an Evolved Node B (eNB or e-NodeB) in LTE, or 5G NodeB (gNB), which is not limited in the present disclosure, but for convenience of description, the gNB is given as an example for description in the following embodiments.

The embodiments of the present disclosure is to provide a method for determining a HARQ-ACK feedback time, a method for indicating the HARQ-ACK feedback time, a terminal device and a network device, so as to achieve configuring of the HARQ-ACK feedback time of received downlink data in non-initial scheduling, when the terminal device performs downlink scheduling in a semi-persistent scheduling manner.

Technical solutions provided by various embodiments of the present disclosure will be described in detail below in conjunction with the drawings.

Figure 1:
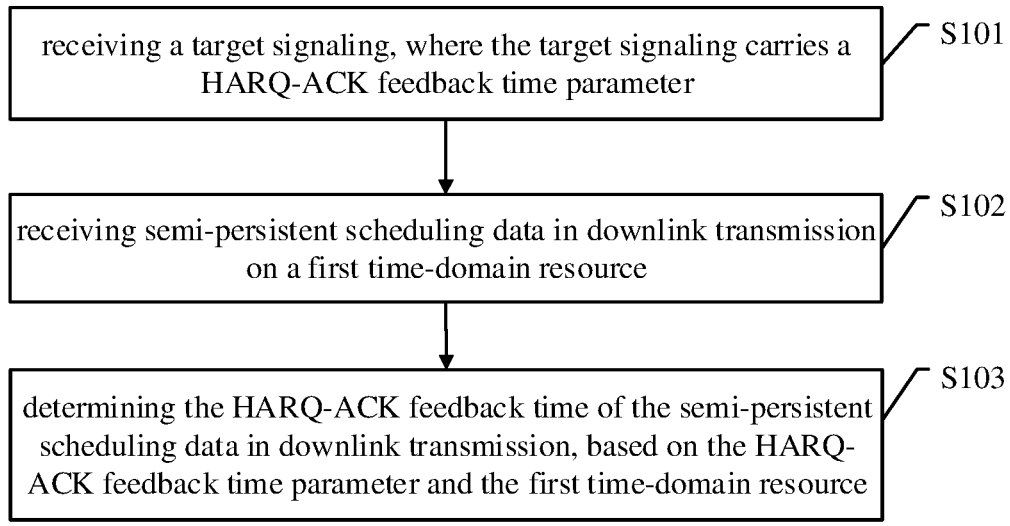
FIG. 1 is a schematic flowchart of a method for determining a HARQ-ACK feedback time according to an embodiment of the present disclosure.

FIG. 1 is a flowchart of a method for determining a HARQ-ACK feedback time according to an embodiment of the present disclosure. In the embodiment, the method for determining a HARQ-ACK feedback time is applied to a terminal device. The method shown in FIG. 1 may include steps 101 to 103.

Step 101 includes: receiving a target signaling, where the target signaling carries a HARQ-ACK feedback time parameter.

In an embodiment of the present disclosure, the terminal device may configure downlink semi-persistent scheduling. Specifically, the terminal device may configure downlink semi-persistent scheduling based on high-layer signaling, such as radio resource control (RRC) signaling. After the downlink semi-persistent scheduling is configured, the terminal device may currently be in an inactivated semi-persistent scheduling configuration state. At this time, the terminal device may activate the inactivated semi-persistent scheduling configuration, based on the received downlink control signaling, for example, DCI signaling.

In an embodiment of the present disclosure, the terminal device may receive the target signaling transmitted by a network device, for example, a base station, where the target signaling carries the HARQ-ACK feedback time parameter.

In an embodiment, the HARQ-ACK feedback time parameter is carried by a high-layer signaling or a downlink control signaling, that is, the high-layer signaling or the downlink control signaling may be the target signaling.

In an example, in a case the HARQ-ACK feedback time parameter is carried in the downlink control signaling, the downlink control signaling may be determined as the target signaling; and in a case the HARQ-ACK feedback time parameter is not carried in the downlink control signaling, and the HARQ-ACK feedback time parameter is carried in the high-layer signaling, the high-layer signaling may be determined as the target signaling.

In one embodiment, the HARQ-ACK feedback time parameter carried in the target signaling may be a feedback time interval or a feedback time interval range. For example, the HARQ-ACK feedback time parameter carried in the target signaling may be slot K or slots [M, N] (N being greater than M).

In one embodiment, the HARQ-ACK feedback time parameter carried in the target signaling may be used to indicate a feedback time interval, or used to indicate a feedback time interval range.

For example, the HARQ-ACK feedback time parameter carried in the target signaling may be selected from a set, and the set may be configured by high-layer signaling or pre-defined.

It should be noted that, when the target signaling is the above high-layer signaling, the HARQ-ACK feedback time parameter carried by the target signaling may be used to indicate a feedback time interval, or a feedback time interval range.

In an embodiment of the present disclosure, when the target signaling is the above downlink control signaling, a field for storing the HARQ-ACK feedback time parameter in the downlink control signaling is the same as a field for storing a HARQ-ACK feedback time parameter in dynamic scheduling in the downlink control signaling; or when the target signaling is the above downlink control signaling, a field for storing the HARQ-ACK feedback time parameter in the downlink control signaling is a newly added field.

In an embodiment of the present disclosure, when the target signaling is the above downlink control signaling, the target signaling may be a latest downlink control signaling received by the terminal device. For example, the target signaling may specifically be a DCI signaling received by the terminal device, which is closest to and before a semi-persistent scheduling (SPS) physical downlink shared channel (PDSCH).

Step 102 includes: receiving semi-persistent scheduling data in downlink transmission on a first time-domain resource.

In an embodiment of the present disclosure, the first time-domain resource may be represented by a frame, a subframe, a slot, or a symbol.

It should be noted that an execution order of step 102 and step 101 is not limited in the embodiments of the present disclosure. For example, step 101 may be executed after step 102 is executed, or step 101 may be executed while step 102 is executed.

Step 103 includes: determining the HARQ-ACK feedback time of the semi-persistent scheduling data in the downlink transmission, based on the HARQ-ACK feedback time parameter and the first time-domain resource.

In the embodiments of the present disclosure, after receiving the target signaling and the semi-persistent scheduling data of the downlink transmission on the first time-domain resource, the terminal device may determine the HARQ-ACK feedback time of the semi-persistent scheduling data for the downlink transmission, based on the HARQ-ACK feedback time parameter in the target signaling and the first time-domain resource.

In an example, the HARQ-ACK feedback time parameter carried in the target signaling may be a feedback time interval, or a feedback time interval range, then the HARQ-ACK feedback time of the semi-persistent scheduling data for the downlink transmission may be determined based on the first time-domain resource, and the feedback time interval or the feedback time interval range carried in the target signaling.

For example, the HARQ-ACK feedback time parameter carried in the target signaling may be the number of slots K. In a case that the terminal device receives the semi-persistent scheduling data of downlink transmission in a slot H, the HARQ-ACK feedback time of the semi-persistent scheduling data of the downlink transmission determined by the terminal device based on the HARQ-ACK feedback time parameter in the target signaling and the first time-domain resource is a slot K+H.

For another example, the HARQ-ACK feedback time parameter carried in the target signaling may be a range [M, N] of the number of slots. In a case that the terminal device receives the semi-persistent scheduling data of downlink transmission in a slot H, the HARQ-ACK feedback time of the semi-persistent scheduling data of downlink transmission determined by the terminal device based on the HARQ-ACK feedback time parameter in the target signaling and the first time-domain resource is a slot selected from slots [H+M, H+N].

In an example, the HARQ-ACK feedback time parameter carried in the target signaling may be used to indicate position data information of a feedback time interval, or a feedback time interval range. For example, it may be the position data information of the feedback time interval, or the feedback time interval range in the above time set [M, N]. In this case, a terminal device may first determine the feedback time interval or the feedback time interval range from the time set based on the HARQ-ACK feedback time parameter, and then determine the HARQ-ACK feedback time of the semi-persistent scheduling data for the downlink transmission based on the first time-domain resource, and the determined feedback time interval or the determined feedback time interval range.

In an embodiment, in a case that the HARQ-ACK feedback time parameter carried in the target signaling is the feedback time interval, the terminal device may determine a first HARQ-ACK feedback time based on the feedback time interval and the above first time-domain resource, and may determine the first HARQ-ACK feedback time as the HARQ-ACK feedback time, when a time-domain resource format of the first HARQ-ACK feedback time does not conflict with a time-domain resource format indicated by a semi-static or dynamic uplink and downlink configuration.

It should be understood that the time-domain resource format includes three types: uplink, downlink, and undetermined transmission, which is the same to time-domain resource formats in other embodiments.

In another embodiment, in a case that the HARQ-ACK feedback time parameter carried in the target signaling is the feedback time interval, the terminal device may determine a second HARQ-ACK feedback time based on the feedback time interval and the above first time-domain resource, and may determine a latest available uplink time immediately after the second HARQ-ACK feedback time, as the HARQ-ACK feedback time, when a time-domain resource format of the second HARQ-ACK feedback time conflicts with a time-domain resource format indicated by a semi-static or dynamic uplink and downlink configuration.

In yet another embodiment, in a case that the HARQ-ACK feedback time parameter carried in the target signaling is the feedback time interval, the terminal device may determine a third HARQ-ACK feedback time based on the feedback time interval and the above first time-domain resource, and determine a second time-domain resource as the HARQ-ACK feedback time, when a time-domain resource format of the third HARQ-ACK feedback time conflicts with a time-domain resource format indicated by a semi-static or dynamic uplink and downlink configuration. The second time-domain resource is a latest available time-domain resource with an undetermined transmission direction immediately after the third HARQ-ACK feedback time, and the latest available time-domain resource with the undetermined transmission direction has been configured with a physical uplink control channel (PUCCH) resource, and has been scheduled or configured with a physical uplink shared channel (PUSCH) transmission.

In yet another embodiment, in a case that the HARQ-ACK feedback time parameter carried in the target signaling is the feedback time interval range, the terminal device may determine a fourth HARQ-ACK feedback time based on the feedback time interval range and the above-mentioned first time-domain resource, and may determine the fourth HARQ-ACK feedback time as the HARQ-ACK feedback time, when a time-domain resource format of the fourth HARQ-ACK feedback time does not conflict with a time-domain resource format indicated by a semi-static or dynamic uplink and downlink configuration.

In yet another embodiment, in a case that the HARQ-ACK feedback time parameter carried in the target signaling is the feedback time interval range, the terminal device may determine a fifth HARQ-ACK feedback time and a first HARQ-ACK feedback time period based on the feedback time interval range and the above-mentioned first time-domain resource. When a time-domain resource format of the fifth HARQ-ACK feedback time conflicts with a time-domain resource format indicated by a semi-static or dynamic uplink and downlink configuration, and a time-domain resource format of at least one of time-domain resources within the first HARQ-ACK feedback time period does not conflict with the time-domain resource format indicated by the semi-static or dynamic uplink and downlink configuration, the terminal device may determine one of the at least one time-domain resource as the HARQ-ACK feedback time.

In yet another embodiment, in a case that the HARQ-ACK feedback time parameter carried in the target signaling is the feedback time interval range, the terminal device may determine a sixth HARQ-ACK feedback time and a second HARQ-ACK feedback time period based on the feedback time interval range and the above-mentioned first time-domain resource, and when each of time-domain resource formats of all time-domain resources within the second HARQ-ACK feedback time period conflicts with a time-domain resource format indicated by a semi-static or dynamic uplink and downlink configuration, may determine, as the HARQ-ACK feedback time, a latest available uplink time immediately after the second HARQ-ACK feedback time period. The uplink time may be an uplink slot or an uplink symbol.

In yet another embodiment, in a case that the HARQ-ACK feedback time parameter carried in the target signaling is the feedback time interval range, the terminal device may determine a seventh HARQ-ACK feedback time and a third HARQ-ACK feedback time period based on the feedback time interval range and the above-mentioned first time-domain resource. When each of time-domain resource formats of all time-domain resources within the third HARQ-ACK feedback time period conflicts with a time-domain resource format indicated by a semi-static or dynamic uplink and downlink configuration, the terminal device may determine a second time-domain resource as the HARQ-ACK feedback time, where the second time-domain resource is a latest available time-domain resource with an undetermined transmission direction immediately after the third HARQ-ACK feedback time period, and the latest available time-domain resource with the undetermined transmission direction has been configured with a physical uplink control channel (PUCCH) resource, and has been scheduled or configured with a PUSCH transmission.

In still another embodiment, in a case that the HARQ-ACK feedback time parameter carried in the target signaling is the feedback time interval, the terminal device may determine an eighth HARQ-ACK feedback time based on the feedback time interval and the above first time-domain resource, and may abort feeding back a HARQ-ACK, when a time-domain resource format of the eighth HARQ-ACK feedback time conflicts with a time-domain resource format indicated by a semi-static or dynamic uplink and downlink configuration.

In yet another embodiment, in a case that the HARQ-ACK feedback time parameter carried in the target signaling is the feedback time interval range, the terminal device may determine a ninth HARQ-ACK feedback time and a fourth HARQ-ACK feedback time period based on the feedback time interval and the above-mentioned first time-domain resource, and may abort feeding back a HARQ-ACK, when a time-domain resource format of the ninth HARQ-ACK feedback time conflicts with a time-domain resource format indicated by a semi-static or dynamic uplink and downlink configuration.

In an embodiment of the present disclosure, the terminal device may also determine the HARQ-ACK feedback time based on the above first time-domain resource and a fixed value defined in a protocol. The embodiments of the present disclosure does not limit the protocol defining the fixed value.

In an implementation of the present disclosure, in a case that the terminal device receives aggregated PDSCHs, the terminal device may determine the HARQ-ACK feedback time based on a reception time period, during which aggregated PDSCHs are received, and a service processing capability of the terminal device.

For example, the terminal device may receive an aggregated PDSCH in a slot set [N, N+K]. The terminal device determines that its own service processing capability is at least H slots, then determines the HARQ-ACK feedback time as a slot selected from the slot set [N+H, N+K+H].

For example, the terminal device may receive an aggregated PDSCH in the slot set [N, N+K], and the terminal device determines that its own service processing capability is at least H slots, but (S+K) slots are more than H slots, where T is larger than H slots. In this case, the HARQ-ACK feedback time may be a slot in the slot set [N+H+S, N+K+T], where S and T may be determined based on the HARQ-ACK feedback time parameter carried in the above target signaling, according to the above embodiments.

In an embodiment of the present disclosure, the determined HARQ-ACK feedback time of the semi-persistent scheduling data for the downlink transmission may be represented by a frame, a subframe, a slot, or a symbol.

In the embodiments of the present disclosure, the terminal device may receive a target signaling, where the target signaling carries a HARQ-ACK feedback time parameter; and then, the terminal device may receive semi-persistent scheduling data for downlink transmission on a first time-domain resource, and determine a HARQ-ACK feedback time of the semi-persistent scheduling data in the downlink transmission, based on the HARQ-ACK feedback time parameter and the first time-domain resource.

It can be seen that in the embodiments, the terminal device can configure a HARQ-ACK feedback time after the terminal device receives the semi-persistent scheduling data in the downlink transmission, based on the HARQ-ACK feedback time parameter carried in the target signaling and the first time-domain resource, in cases of semi-persistent scheduling and non-initial scheduling, thereby effectively solving the problems in the related technologies.

Figure 2:
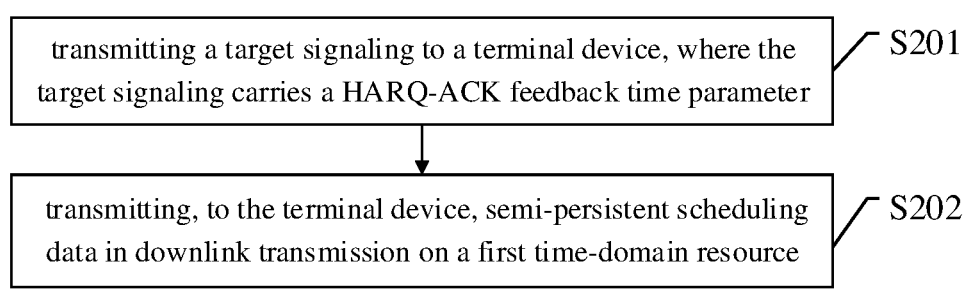
FIG. 2 is a schematic flowchart of a method for indicating a HARQ-ACK feedback time according to another embodiment of the present disclosure.

FIG. 2 is a flowchart of a method for indicating a HARQ-ACK feedback time according to an embodiment of the present disclosure. In this embodiment, the method for indicating a HARQ-ACK feedback time is applied to a network device. The method shown in FIG. 2 may include steps 201 and 202.

Step 201 includes: transmitting a target signaling to a terminal device, where the target signaling carries a HARQ-ACK feedback time parameter.

In an embodiment of the present disclosure, the target signaling may be a downlink control signaling carrying the HARQ-ACK feedback time parameter, or a high-layer signaling carrying the HARQ-ACK feedback time parameter.

In an embodiment of the present disclosure, the HARQ-ACK feedback time parameter in the target signaling may carry a feedback time interval or a feedback time interval range.

In an embodiment, the HARQ-ACK feedback time parameter in the above target signaling may carry indication information for indicating the feedback time interval or the feedback time interval range.

In an embodiment of the present disclosure, when the target signaling is the above downlink control signaling, a field for storing the HARQ-ACK feedback time parameter in the downlink control signaling is the same as a field for storing a HARQ-ACK feedback time parameter in dynamic scheduling in the downlink control signaling; or a field for storing the HARQ-ACK feedback time parameter in the downlink control signaling is a newly added field.

Step 202 includes: transmitting, to the terminal device, semi-persistent scheduling data in downlink transmission on a first time-domain resource, where the HARQ-ACK feedback time parameter is used to indicate the terminal device to determine the HARQ-ACK feedback time of the semi-persistent scheduling data in downlink transmission based on the HARQ-ACK feedback time parameter and the first time-domain resource.

In an embodiment of the present disclosure, at least one of the first time-domain resource or the HARQ-ACK feedback time of the semi-persistent scheduling data of the downlink transmission transmitted by the network device may be represented by a frame, a subframe, a slot, or a symbol.

For specific implementation processes of the embodiments of the present disclosure, reference may be made to the above-mentioned embodiments of the present disclosure, so the embodiments of the present disclosure will not be repeated herein.

In the embodiments of the present disclosure, the network device may transmit a target signaling to the terminal device, where the target signaling carries the HARQ-ACK feedback time parameter; and then, the network device may transmit semi-persistent scheduling data in downlink transmission on a first time-domain resource to the terminal device. The HARQ-ACK feedback time parameter may be used to indicate the terminal device to determine the HARQ-ACK feedback time of the semi-persistent scheduling data in downlink transmission based on the HARQ-ACK feedback time parameter and the first time-domain resource.

It can be seen that in the embodiments, the network device can transmit the target signaling to the terminal device, and can transmit the semi-persistent scheduling data for downlink transmission to the terminal device on the first time-domain resource, so that the terminal device can configure a HARQ-ACK feedback time after the terminal device receives the semi-persistent scheduling data in the downlink transmission, based on the target signaling and the first time-domain resource, in cases of semi-persistent scheduling and non-initial scheduling, thereby effectively solving the problems in the related technologies.

Figure 3:
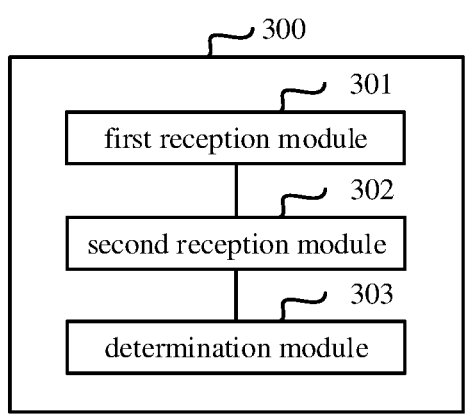
FIG. 3 is a schematic structural diagram of a terminal device according to an embodiment of the present disclosure.

FIG. 3 is a schematic structural diagram of a terminal device according to embodiments of the present disclosure. As shown in FIG. 3, the terminal device 300 may include:

a first reception module 301 configured to receive a target signaling, where the target signaling carries a HARQ-ACK feedback time parameter;

a second reception module 302 configured to receive semi-persistent scheduling data in downlink transmission on a first time-domain resource; and a determination module 303 configured to determine the HARQ-ACK feedback time of the semi-persistent scheduling data in the downlink transmission, based on the HARQ-ACK feedback time parameter and the first time-domain resource.

Optionally, the HARQ-ACK feedback time parameter is a feedback time interval or a feedback time interval range.

Optionally, in some embodiments, in a case that the HARQ-ACK feedback time parameter is the feedback time interval, the determination module 303 includes:

a first determination sub-module configured to determine a first HARQ-ACK feedback time based on the feedback time interval and the first time-domain resource; and a second determination sub-module configured to determine, as the HARQ-ACK feedback time, a latest available uplink time after the first HARQ-ACK feedback time, when a time-domain resource format of the first HARQ-ACK feedback time conflicts with a time-domain resource format indicated by a semi-static or dynamic uplink and downlink configuration.

Optionally, in some embodiments, in a case that the HARQ-ACK feedback time parameter is the feedback time interval, the determination module 303 includes:

a first determination sub-module configured to determine a first HARQ-ACK feedback time based on the feedback time interval and the first time-domain resource; and a second determination sub-module configured to: determine a second time-domain resource as the HARQ-ACK feedback time, when a time-domain resource format of the first HARQ-ACK feedback time conflicts with a time-domain resource format indicated by a semi-static or dynamic uplink and downlink configuration, where the second time-domain resource is a latest available time-domain resource with an undetermined transmission direction after the first HARQ-ACK feedback time, and the latest available time-domain resource with the undetermined transmission direction has been configured with a physical uplink control channel (PUCCH) resource, and has been scheduled or configured with a physical uplink shared channel (PUSCH) transmission.

Optionally, in some embodiments, in a case that the HARQ-ACK feedback time parameter is the feedback time interval range, the determination module 303 includes:

a first determination sub-module configured to determine a second HARQ-ACK feedback time and a HARQ-ACK feedback time period based on the feedback time interval range and the first time-domain resource; and a second determination sub-module configured to: when a time-domain resource format of the second HARQ-ACK feedback time conflicts with a time-domain resource format indicated by a semi-static or dynamic uplink and downlink configuration, and a time-domain resource format of at least one of time-domain resources within the HARQ-ACK feedback time period does not conflict with the time-domain resource format indicated by the semi-static or dynamic uplink and downlink configuration, determine one of the at least one time-domain resource as the HARQ-ACK feedback time.

Optionally, in some embodiments, in a case that the HARQ-ACK feedback time parameter is the feedback time interval range, the determination module 303 includes:

a first determination sub-module configured to determine a second HARQ-ACK feedback time and a HARQ-ACK feedback time period based on the feedback time interval range and the first time-domain resource; and a second determination sub-module configured to: when each of time-domain resource formats of all time-domain resources within the HARQ-ACK feedback time period conflicts with a time-domain resource format indicated by a semi-static or dynamic uplink and downlink configuration, determine, as the HARQ-ACK feedback time, a latest available uplink time after the HARQ-ACK feedback time period.

Optionally, in some embodiments, in a case that the HARQ-ACK feedback time parameter is the feedback time interval range, the determination module 303 includes:

a first determination sub-module configured to determine a second HARQ-ACK feedback time and a HARQ-ACK feedback time period, based on the feedback time interval range and the first time-domain resource; and a second determination sub-module configured to: when each of time-domain resource formats of all time-domain resources within the HARQ-ACK feedback time period conflicts with a time-domain resource format indicated by a semi-static or dynamic uplink and downlink configuration, determine a second time-domain resource as the HARQ-ACK feedback time, where the second time-domain resource is a latest available time-domain resource with an undetermined transmission direction after the HARQ-ACK feedback time period, and the latest available time-domain resource with the undetermined transmission direction has been configured with a physical uplink control channel (PUCCH) resource, and has been scheduled or configured with a PUSCH transmission.

Optionally, in some embodiments, at least one of the first time-domain resource or the HARQ-ACK feedback time of the semi-persistent scheduling data in the downlink transmission is represented by a frame, a subframe, a slot, or a symbol.

Optionally, in some embodiments, the target signaling is a high-layer signaling or a downlink control signaling, where the high-layer signaling is used to configure the downlink semi-persistent scheduling configuration, and the downlink control signaling is used to activate the downlink semi-persistent scheduling configuration.

Optionally, in some embodiments, when the target signaling is a downlink control signaling, the target signaling is a latest downlink control signaling received by the terminal device.

The terminal device 300 can also execute the method shown in FIG. 1 and implement functions of the terminal device in the embodiments shown in FIG. 1. For specific implementations, reference may be made to the embodiments shown in FIG. 1, and details are not described again.

Figure 4:
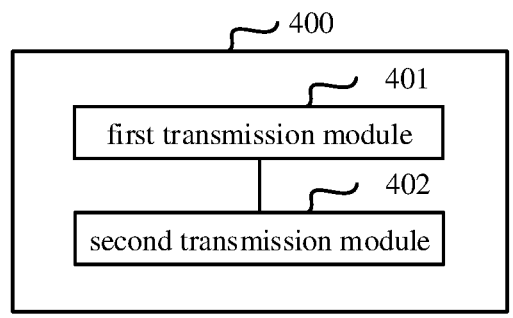
FIG. 4 is a schematic structural diagram of a network device according to an embodiment of the present disclosure.

FIG. 4 is a schematic structural diagram of a network device according to embodiments of the present disclosure. As shown in FIG. 4, the network device 400 may include:

a first transmission module 401 configured to transmit a target signaling to a terminal device, where the target signaling carries a HARQ-ACK feedback time parameter; and a second transmission module 402 configured to transmit semi-persistent scheduling data in downlink transmission to the terminal device on a first time-domain resource;

where the HARQ-ACK feedback time parameter is used to indicate the terminal device to determine the HARQ-ACK feedback time of the semi-persistent scheduling data in the downlink transmission based on the HARQ-ACK feedback time parameter and the first time-domain resource.

Optionally, in some embodiments, the HARQ-ACK feedback time parameter carries a feedback time interval or a feedback time interval range.

Optionally, in some embodiments, in a case that the target signaling is a downlink control signaling, the downlink control signaling is the latest downlink control signaling transmitted to the terminal device.

Optionally, in some embodiments, in a case that the target signaling is a downlink control signaling, a field for storing the HARQ-ACK feedback time parameter in the downlink control signaling is the same as a field for storing a HARQ-ACK feedback time parameter in dynamic scheduling in the downlink control signaling.

Optionally, in some embodiments, in a case that the target signaling is a downlink control signaling, a field for storing the HARQ-ACK feedback time parameter in the downlink control signaling is a newly added field.

Optionally, in some embodiments, at least one of the first time-domain resource or the HARQ-ACK feedback time of the semi-persistent scheduling data in the downlink transmission is represented by a frame, a subframe, a slot, or a symbol.

Optionally, in some embodiments, the target signaling is a high-layer signaling or a downlink control signaling, where the high-layer signaling is used to configure the downlink semi-persistent scheduling configuration, and the downlink control signaling is used to activate the downlink semi-persistent scheduling configuration.

The network device 400 can also perform the method shown in FIG. 2 and implement functions of the network device in the embodiments shown in FIG. 2. For specific implementations, reference may be made to the embodiment shown in FIG. 2, and details are not described again.

Figure 5:
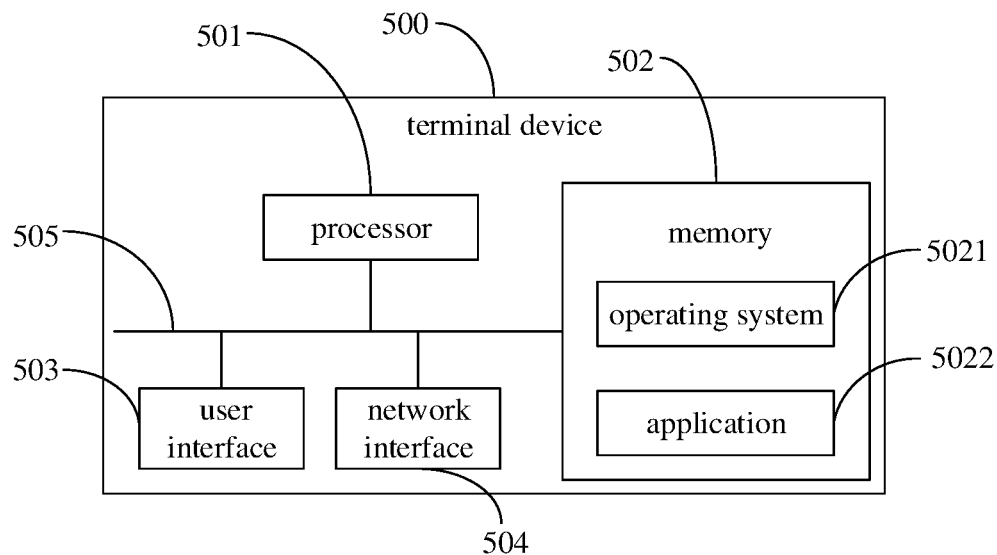
FIG. 5 is a block diagram of a terminal device according to another embodiment of the present disclosure.

FIG. 5 is a block diagram of a terminal device according to another embodiment of the present disclosure. The terminal device 500 shown in FIG. 5 includes: at least one processor 501, a memory 502, at least one network interface 504, and a user interface 503. The various components in the terminal device 500 are coupled together via a bus system 505. Understandably, the bus system 505 is configured to implement connections and communications between these components. In addition to the data bus, the bus system 505 includes a power bus, a control bus, and a status signal bus. However, for clarity, various buses are labelled as the bus system 505 in FIG. 5.

The user interface 503 may include a display, a keyboard, or a pointing device (for example, a mouse, a trackball, a touch pad, or a touch screen, etc.).

It is understood that the memory 502 according to the embodiments of the present disclosure may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 502 in the systems and methods described herein is meant to include, without limitation, these and any other suitable types of memories.

In some implementations, the memory 502 stores the following elements: an executable module or a data structure, or a subset or extension set thereof, such as an operating system 5021 and an application 5022.

The operating system 5021 includes various system programs, such as framework layer programs, core library layer programs and driver layer programs, to implement various fundamental services and process hardware-based tasks. The application includes various applications, such as media player and browser, to implement a variety of application services. The program implementing the methods according to the embodiments of the present disclosure may be included in the application 5022.

In embodiments of the present disclosure, the terminal device 500 may include: a computer program stored in the memory 502 and executable by the processor 501. The computer program is configured to be executed by the processor 501 to implement the following steps:

receiving a target signaling, wherein the target signaling carries a HARQ-ACK feedback time parameter;

receiving semi-persistent scheduling data in downlink transmission on a first time-domain resource; and determining the HARQ-ACK feedback time of the semi-persistent scheduling data in the downlink transmission, based on the HARQ-ACK feedback time parameter and the first time-domain resource.

The methods disclosed in the foregoing embodiments of the present disclosure may be applied to the processor 501 or implemented by the processor 501. The processor 501 may be an integrated circuit with signal processing capability. During an implementation process, steps of the methods may be realized in form of hardware by integrated logical circuits in the processor 501, or in form of software by instructions. The processor 501 may be a general purpose processor, a digital signal processor (DSP), an application specific integrated circuit (ASIC), a field programmable gate array (FPGA) or other programmable logic device, a discrete gate, a transistor logic device, or a discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register, etc. The storage medium resides in the memory 502. The processor 501 reads information from the memory 502 and performs the steps of the methods with its hardware. Specifically, a computer program is stored on the computer-readable storage medium, and the computer program is executed by the processor 501 to implement various steps of the method embodiments shown in FIG. 1.

It can be understood that the embodiments described in the embodiments of the present disclosure may be implemented by hardware, software, firmware, middleware, microcode, or a combination thereof. For hardware implementations, the processing unit can be implemented in one or more of: an application specific integrated circuits (ASIC), a digital signal processor (DSP), a digital signal processing device (DSP devices), a programmable logic device (PLD), a field-programmable gate array (FPGA), a general-purpose processor, a controller, a microcontroller, a microprocessor, other electronic units for performing the functions described in the present disclosure or a combination thereof.

For software implementations, the technology described in the embodiments of the present disclosure may be implemented by executing functional modules (for example, procedures, functions, and etc.) described in the embodiments of the present disclosure. The software codes can be stored in the memory and executed by the processor. The memory may be implemented in the processor or outside the processor.

The terminal device 500 can also implement various processes implemented by the terminal device in the foregoing embodiments shown in FIG. 1. To avoid repetition, details are not described herein again.

Optionally, embodiments of the present disclosure further provide a terminal device, including a processor 510, a memory 502, a computer program stored on the memory 502 and executable on the processor 510. The processor 510 is configured to execute the computer program to implement various processes of the above method embodiments in FIG. 1, and the same technical effects can be achieved. To avoid repetition, details are not described herein.

Embodiments of the present disclosure further provide a computer-readable storage medium, and a computer program is stored on the computer-readable storage medium. The computer program is executed by a processor to implement various processes of the above method embodiments in FIG. 1, and the same technical effects can be achieved. To avoid repetition, details are not described herein. The computer-readable storage medium may be, for example, a read-only memory (ROM), a random access memory (RAM), a magnetic disk or an optical disk, etc.

Figure 6:
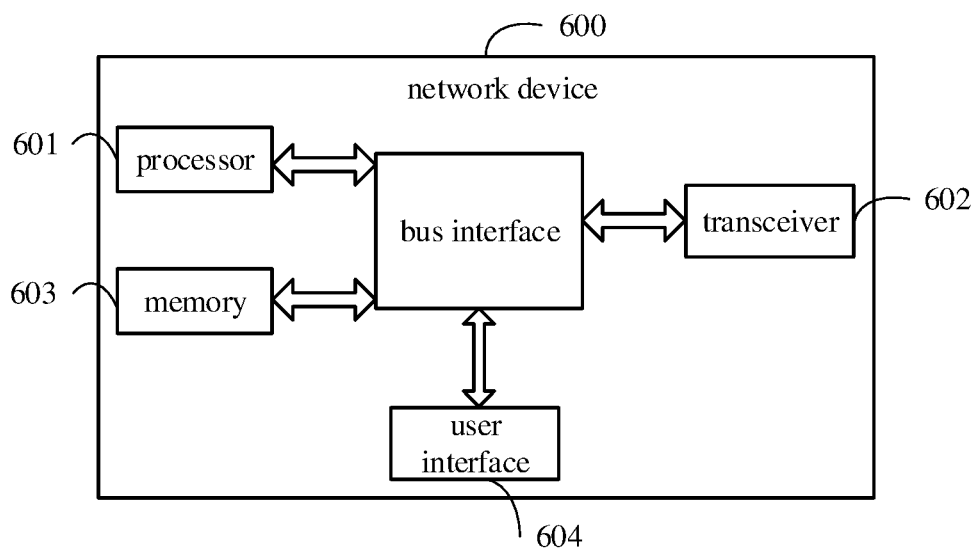
FIG. 6 is a structural diagram of a network-side device applied in an embodiment of the present disclosure.

Reference is made to FIG. 6, which is a structural diagram of a network-side device applied in embodiments of the present disclosure, which can implement details of the method in the embodiments shown in FIG. 2 and achieve the same effects. As shown in FIG. 6, the network-side device 600 includes: a processor 601, a transceiver 602, a memory 603, a user interface 604, and a bus interface.

In an embodiment of the present disclosure, the network-side device 600 further includes: a computer program stored on the memory 603 and executable on the processor 601. The computer program is executed by the processor 601 to implement the following steps:

transmitting a target signaling to a terminal device, where the downlink control signaling carries a HARQ-ACK feedback time parameter; and transmitting, to the terminal device, semi-persistent scheduling data in downlink transmission on a first time-domain resource, where the HARQ-ACK feedback time parameter is used to indicate the terminal device to determine the HARQ-ACK feedback time of the semi-persistent scheduling data in the downlink transmission based on the HARQ-ACK feedback time parameter and the first time-domain resource.

In FIG. 6, the bus architecture may include any number of interconnected buses and bridges. Specifically, various circuits including one or more processors represented by the processor 601 and one or more memories represented by the memory 603 are linked together. The bus architecture can also link various other circuits such as a peripheral device, a voltage regulator, and a power management circuit, etc., which are well known in the art, and thus, will not be further described in this specification. The bus interface provides an interface. The transceiver 602 may include a plurality of elements, including a transmitter and a receiver, and provides a unit for communicating with various other devices on a transmission medium. For different UEs, the user interface 604 may also be an interface that can be externally connected to the required equipment. The connected equipment includes but is not limited to a keypad, a display, a speaker, a microphone, a joystick, and the like.

The processor 601 is responsible for managing the bus architecture and general processing, and the memory 603 may store data used by the processor 601 when performing operations.

The network device 600 can also implement various processes implemented by the network device in the foregoing embodiments shown in FIG. 2. To avoid repetition, details are not described herein again.

Embodiments of the present disclosure further provide a computer-readable storage medium, and a computer program is stored on the computer-readable storage medium. The computer program is executed by a processor to implement various processes of the above method embodiments in FIG. 2, and the same technical effects can be achieved. To avoid repetition, details are not described herein. The computer-readable storage medium may be, for example, a read-only memory (ROM), a random access memory (RAM), a magnetic disk or an optical disk, etc.

It should be noted that in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments can be implemented by means of software plus a necessary universal hardware platform, and also may be implemented by hardware, but in many cases the former is preferred. Based on this understanding, the technical solution of the present disclosure that is essentially or contributes to the conventional technologies can be embodied in the form of a software product that is stored in a storage medium (such as a ROM/RAM, a magnetic disk, or an optical disc), which includes several instructions for enabling a terminal (which may be a mobile phone, a computer, a server, an air conditioner, or a network device) to execute the method described in the embodiments of the present disclosure.

The embodiments of the present disclosure are described above with reference to the accompanying drawings, but the present disclosure is not limited to the above-mentioned specific implementations. The above-mentioned specific implementations are merely illustrative, but not restrictive. Under the inspiration of the present disclosure, those of ordinary skill in the art can make many forms without departing from the principles of the present disclosure and the protection scope of the claims, and all of the forms shall fall within the protection scope of the present disclosure.

What is claimed is:

1. A method for determining a hybrid automatic repeat request acknowledgement (HARQ-ACK) feedback time, applied to a terminal device, comprising:
receiving a downlink control signaling, wherein the downlink control signaling carries a HARQ-ACK feedback time parameter, and the downlink control signaling is used to activate a downlink semi-persistent scheduling configuration;
receiving semi-persistent scheduling data in downlink transmission on a first time-domain resource; and
determining the HARQ-ACK feedback time of the semi-persistent scheduling data in the downlink transmission, based on the HARQ-ACK feedback time parameter and the first time-domain resource,
wherein the HARQ-ACK feedback time parameter comprises a feedback time interval,
wherein in a case that the HARQ-ACK feedback time parameter is the feedback time interval, the determining the HARQ-ACK feedback time of the semi-persistent scheduling data in the downlink transmission, based on the HARQ-ACK feedback time parameter and the first time-domain resource comprises:
determining a first HARQ-ACK feedback time based on the feedback time interval and the first time-domain resource; and
determining, as the HARQ-ACK feedback time, an available uplink time immediately after the first HARQ-ACK feedback time, when a time-domain resource format of the first HARQ-ACK feedback time conflicts with a time-domain resource format indicated by a semi-static or dynamic uplink and downlink configuration.

2. The method according to claim 1, wherein the HARQ-ACK feedback time parameter further comprises a feedback time interval range.

3. The method according to claim 2, wherein in a case that the HARQ-ACK feedback time parameter is the feedback time interval range, the determining the HARQ-ACK feedback time of the semi-persistent scheduling data in downlink transmission, based on the HARQ-ACK feedback time parameter and the first time-domain resource comprises:
determining a second HARQ-ACK feedback time and a HARQ-ACK feedback time period based on the feedback time interval range and the first time-domain resource; and
when a time-domain resource format of the second HARQ-ACK feedback time conflicts with a time-domain resource format indicated by a semi-static or dynamic uplink and downlink configuration, and a time-domain resource format of at least one of time-domain resources within the HARQ-ACK feedback time period does not conflict with the time-domain resource format indicated by the semi-static or dynamic uplink and downlink configuration, determining one of the at least one time-domain resource as the HARQ-ACK feedback time.

4. The method according to claim 2, wherein in a case that the HARQ-ACK feedback time parameter is the feedback time interval range, the determining the HARQ-ACK feedback time of the semi-persistent scheduling data in downlink transmission, based on the HARQ-ACK feedback time parameter and the first time-domain resource comprises:
determining a second HARQ-ACK feedback time and a HARQ-ACK feedback time period based on the feedback time interval range and the first time-domain resource; and
when each of time-domain resource formats of all time-domain resources within the HARQ-ACK feedback time period conflicts with a time-domain resource format indicated by a semi-static or dynamic uplink and downlink configuration, determining, as the HARQ- ACK feedback time, an available uplink time immediately after the HARQ-ACK feedback time period.

5. The method according to claim 2, wherein in a case that the HARQ-ACK feedback time parameter is the feedback time interval range, the determining the HARQ-ACK feedback time of the semi-persistent scheduling data in downlink transmission, based on the HARQ-ACK feedback time parameter and the first time-domain resource comprises:
determining a second HARQ-ACK feedback time and a HARQ-ACK feedback time period, based on the feedback time interval range and the first time-domain resource; and
when each of time-domain resource formats of all time-domain resources within the HARQ-ACK feedback time period conflicts with a time-domain resource format indicated by a semi-static or dynamic uplink and downlink configuration, determining a second time-domain resource as the HARQ-ACK feedback time, wherein the second time-domain resource is an available time-domain resource with an undetermined transmission direction immediately after the first HARQ-ACK feedback time, and the available time-domain resource with the undetermined transmission direction has been configured with a physical uplink control channel (PUCCH) resource, and has been scheduled or configured with a physical uplink shared channel (PUSCH) transmission.

6. The method according to claim 1, wherein in a case that the HARQ-ACK feedback time parameter is the feedback time interval, the determining the HARQ-ACK feedback time of the semi-persistent scheduling data in the downlink transmission, based on the HARQ-ACK feedback time parameter and the first time-domain resource comprises:
determining a first HARQ-ACK feedback time based on the feedback time interval and the first time-domain resource; and
determining a second time-domain resource as the HARQ-ACK feedback time, when a time-domain resource format of the first HARQ-ACK feedback time conflicts with a time-domain resource format indicated by a semi-static or dynamic uplink and downlink configuration, wherein the second time-domain resource is an available time-domain resource with an undetermined transmission direction immediately after the first HARQ-ACK feedback time, and the available time-domain resource with the undetermined transmission direction has been configured with a physical uplink control channel (PUCCH) resource, and has been scheduled or configured with a physical uplink shared channel (PUSCH) transmission.

7. The method according to claim 1, wherein at least one of the first time-domain resource or the HARQ-ACK feedback time of the semi-persistent scheduling data in the downlink transmission is represented by a frame, a subframe, a slot, or a symbol.

8. The method according to claim 1, wherein the downlink control signaling is a downlink control signaling most recently received by the terminal device.

9. A method for indicating a hybrid automatic repeat request acknowledgement (HARQ-ACK) feedback time, applied to a network device, comprising:
transmitting a downlink control signaling to a terminal device, wherein the downlink control signaling carries a HARQ-ACK feedback time parameter, and the downlink control signaling is used to activate a downlink semi-persistent scheduling configuration; and
transmitting, to the terminal device, semi-persistent scheduling data in downlink transmission on a first time-domain resource,
wherein the HARQ-ACK feedback time parameter is used to indicate the terminal device to determine the HARQ-ACK feedback time of the semi-persistent scheduling data in the downlink transmission based on the HARQ-ACK feedback time parameter and the first time-domain resource,
wherein the HARQ-ACK feedback time parameter comprises a feedback time interval, in a case that the HARQ-ACK feedback time parameter is the feedback time interval, the determining the HARQ-ACK feedback time of the semi-persistent scheduling data in the downlink transmission, based on the HARQ-ACK feedback time parameter and the first time-domain resource comprises:
determining a first HARQ-ACK feedback time based on the feedback time interval and the first time-domain resource; and
determining, as the HARQ-ACK feedback time, an available uplink time immediately after the first HARQ-ACK feedback time, when a time-domain resource format of the first HARQ-ACK feedback time conflicts with a time-domain resource format indicated by a semi-static or dynamic uplink and downlink configuration.

10. The method according to claim 9, wherein the HARQ-ACK feedback time parameter further comprises a feedback time interval range.

11. The method according to claim 10, wherein the downlink control signaling is a downlink control signaling most recently transmitted to the terminal device.

12. The method according to claim 9, wherein a field for storing the HARQ-ACK feedback time parameter in the downlink control signaling is the same as a field for storing a HARQ-ACK feedback time parameter in dynamic scheduling in the downlink control signaling; or
a field for storing the HARQ-ACK feedback time parameter in the downlink control signaling is a newly added field.

13. The method according to claim 9, wherein at least one of the first time-domain resource or the HARQ-ACK feedback time of the semi-persistent scheduling data in the downlink transmission is represented by a frame, a subframe, a slot, or a symbol.

14. A terminal device, configured with downlink semi-persistent scheduling, comprising: a memory, a processor, and a program that is stored on the memory and executable on the processor, wherein when executing the program, the processor is configured to:
receive a downlink control signaling, wherein the downlink control signaling carries a HARQ-ACK feedback time parameter, and the downlink control signaling is used to activate a downlink semi-persistent scheduling configuration;
receive semi-persistent scheduling data in downlink transmission on a first time-domain resource; and
determine the HARQ-ACK feedback time of the semi-persistent scheduling data in the downlink transmission, based on the HARQ-ACK feedback time parameter and the first time-domain resource,
wherein the HARQ-ACK feedback time parameter comprises a feedback time interval,
wherein in a case that the HARQ-ACK feedback time parameter is the feedback time interval, the determining the HARQ-ACK feedback time of the semi-persistent scheduling data in the downlink transmission, based on the HARQ-ACK feedback time parameter and the first time-domain resource comprises:
determining a first HARQ-ACK feedback time based on the feedback time interval and the first time-domain resource; and
determining, as the HARQ-ACK feedback time, an available uplink time immediately after the first HARQ-ACK feedback time, when a time-domain resource format of the first HARQ-ACK feedback time conflicts with a time-domain resource format indicated by a semi-static or dynamic uplink and downlink configuration.

15. The terminal device according to claim 14, wherein the HARQ-ACK feedback time parameter further comprises a feedback time interval range.

16. The terminal device according to claim 15, wherein in a case that the HARQ-ACK feedback time parameter is the feedback time interval range, the processor is configured to:
determine a second HARQ-ACK feedback time and a HARQ-ACK feedback time period based on the feedback time interval range and the first time-domain resource; and
when a time-domain resource format of the second HARQ-ACK feedback time conflicts with a time-domain resource format indicated by a semi-static or dynamic uplink and downlink configuration, and a time-domain resource format of at least one of time-domain resources in the HARQ-ACK feedback time period does not conflict with the time-domain resource format indicated by the semi-static or dynamic uplink and downlink configuration, determine one of the at least one time-domain resource as the HARQ-ACK feedback time.

17. The terminal device according to claim 15, wherein in a case that the HARQ-ACK feedback time parameter is the feedback time interval range, the processor is configured to:
determine a second HARQ-ACK feedback time and a HARQ-ACK feedback time period based on the feedback time interval range and the first time-domain resource, and
when time-domain resource formats of all time-domain resources within the HARQ-ACK feedback time period conflicts with a time-domain resource format indicated by a semi-static or dynamic uplink and downlink configuration, determine, as the HARQ-ACK feedback time, a available uplink time immediately after the HARQ-ACK feedback time period; or determine a second HARQ-ACK feedback time and a HARQ-ACK feedback time period, based on the feedback time interval range and the first time-domain resource, and
when each of time-domain resource formats of all time-domain resources within the HARQ-ACK feedback time period conflicts with a time-domain resource format indicated by a semi-static or dynamic uplink and downlink configuration, determine a second time-domain resource as the HARQ-ACK feedback time, wherein the second time-domain resource is an available time-domain resource with an undetermined transmission direction immediately after the first HARQ-ACK feedback time, and the available time-domain resource with the undetermined transmission direction has been configured with a physical uplink control channel (PUCCH) resource, and has been scheduled or configured with a physical uplink shared channel (PUSCH) transmission.

18. The terminal device according to claim 14, wherein in a case that the HARQ-ACK feedback time parameter is the feedback time interval, the processor is configured to:
determine a first HARQ-ACK feedback time based on the feedback time interval and the first time-domain resource, and
determine a second time-domain resource as the HARQ-ACK feedback time, when a time-domain resource format of the first HARQ-ACK feedback time conflicts with a time-domain resource format indicated by a semi-static or dynamic uplink and downlink configuration, wherein the second time-domain resource is an available time-domain resource with an undetermined transmission direction immediately after the first HARQ-ACK feedback time, and the available time-domain resource with the undetermined transmission direction has been configured with a physical uplink control channel (PUCCH) resource, and has been scheduled or configured with a physical uplink shared channel (PUSCH) transmission.

19. The terminal device according to claim 14, wherein at least one of the first time-domain resource or the HARQ-ACK feedback time of the semi-persistent scheduling data in the downlink transmission is represented by a frame, a subframe, a slot, or a symbol.

20. A network device, comprising: a memory, a processor, and a program that is stored on the memory and executable on the processor, wherein the processor is configured to, when executing the program, implement steps of the method according to claim 9.

* * * * *